(12) United States Patent
Lyons et al.

(10) Patent No.: US 8,158,094 B2
(45) Date of Patent: Apr. 17, 2012

(54) METHODS OF PREPARING METAL CARBIDES

(75) Inventors: Karen Swider Lyons, Alexandria, VA (US); Arnold M. Stux, Rochester, NY (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 347 days.

(21) Appl. No.: 12/464,429

(22) Filed: May 12, 2009

(65) Prior Publication Data

US 2010/0291298 A1    Nov. 18, 2010

(51) Int. Cl.
  *C01B 31/30* (2006.01)
(52) U.S. Cl. .................... 423/439; 148/278
(58) Field of Classification Search .......... 423/439; 148/278
  See application file for complete search history.

(56) References Cited

U.S. PATENT DOCUMENTS

2007/0284289 A1* 12/2007 Rodrigues et al. ........... 208/209

OTHER PUBLICATIONS

Luiza G. Pereira, MoO3-based HDS catalyst obtained by the polymeric precursor method, Science Direct by Elsevier, Feb. 9, 2006, Materials Letter 60 (2006) 2638-2641.
Arnold M. Stux, Pechini synthesis and characterization of molybdenum carbide and nickel molydenum carbide, Journal of Solid State Chemistry by Elsevier, Jul. 1, 2008, 2741-2747.

* cited by examiner

*Primary Examiner* — Stuart Hendrickson
*Assistant Examiner* — Richard M Rump
(74) *Attorney, Agent, or Firm* — Amy L. Ressing; Stephen T. Hunnius

(57) ABSTRACT

The present embodiments relate methods of preparing metal carbides, for example some embodiments relate to methods of preparing metal carbides that do not contain the formation of an intermediate oxide compound. Some embodiments relate to methods that do not employ hydrocarbons in the reaction. Some embodiments relate to a method of preparing metal carbides that involves citrate gel precursors and a non-hydrocarbon gas but does not use a hydrocarbon gas, does not form an oxide intermediate species and does not produce carbon monoxide. In some embodiments, the metal carbides are transition metal carbides.

20 Claims, 7 Drawing Sheets

METHODS OF PREPARING METAL CARBIDES

FIELD OF THE INVENTION

The present embodiments relate methods of preparing metal carbides, for example some embodiments relate to methods of preparing metal carbides that do not contain the formation of an intermediate oxide compound. Some embodiments relate to methods that do not employ hydrocarbons in the reaction.

BACKGROUND

Metal carbides are metal compounds containing carbon in the interstices of the metal grid. In addition to possessing metallurgical properties, such as hardness and exceptional mechanical strength, these materials also have interesting catalytic properties. For example, molybdenum carbide and tungsten carbide possess catalytic properties that vary from corresponding metals and are similar to those found in metals such as platinum, palladium and rhodium, which are all more expensive.

Transition metal carbides are traditionally synthesized by carburization of metal oxides. Carburization can be achieved several different ways such as, for example, carbothermal reduction, electrochemical synthesis, arc melting with graphite, thermal decomposition of diethylenitriamine oxometal compounds, and reduction of oxides by $H_2$ or mixtures of a hydrocarbon gas such as methane as the carburizing gas. Another method uses propane instead of methane mixed with $H_2$ gas to obtain metal carbides.

Transition metal carbides were traditionally investigated for their mechanical hardness and high melting points for steel hardening, but they are also now used as catalysts for ammonia synthesis and decomposition, hydrogenolysis, isomerization, methanation, and hydroprocessing. Some molybdenum and tungsten-carbides behave similar to platinum in their catalytic properties. Catalytic activity of the carbides arises from the carbon atoms, which comprise up to 50% of their crystal structure, and which increase the metal-metal distance thus increasing the d-band electron density at the Fermi level of the transition metals (see FIG. 1). The ability of some carbides to mimic platinum has created interest in using them as a noble-metal-free replacement for the platinum/carbon electrocatalyst used in fuel cells.

Some methods to prepare carbides include a high temperature reaction. Transition metal carbides are traditionally synthesized by carburization of metal oxides. As discussed above, carburization can be achieved several different ways, for example, (a) carbothermal reduction, (b) electrochemical synthesis, (c) arc melting with graphite, (d) thermal decomposition of diethylenitriamine oxometal compounds and (e) reduction of oxides by $H_2$ or mixtures of $H_2$ with hydrocarbon gas as the carburizing gas. However, these traditional methods require multiple steps, hydrocarbons and the use of carbon monoxide. The inefficiency of multistep processes makes these approaches inefficient and expensive. Further, the use of flammable hydrocarbons in these traditional methods increases the risk of fire and explosion and the use of carbon monoxide requires implementation of expensive safety equipment and disposal protocols. The need for better approaches to prepare carbides is manifest.

SUMMARY OF THE INVENTION

It has been discovered that metal carbides can be prepared upon heating metal acetate precursors in the absence of hydrocarbons. Unlike traditional synthetic processes that use methane or other hydrocarbons and carbon monoxide, the embodiments described herein concern metal carbide syntheses, wherein a non-hydrocarbon gas such as $H_2$ flows over metal acetate precursors, which promotes the carburization process. The described process can be used for production of any metal carbide, as are useful in metal alloys and as catalysts.

Some embodiments relate to a method of preparing at least one metal carbide comprising:

combining at least one metal acetate, an acid and a polyhydroxy alcohol in a first solution;

heating the first solution to a first temperature of from about 40° C. to about 200° C. to form a second solution;

heating the second solution to a second higher temperature of from about 500° C. to about 1500° C. with the addition of $H_2$ gas to form the at least one metal carbide; and cooling the at least one metal carbide;

wherein substantially no hydrocarbon gas is introduced to the first solution or second solution throughout the method.

In some embodiments, the second solution has a volume that is from about 3% to about 30% of the volume of the first solution.

In some embodiments, the at least one metal acetate is at least one transition metal acetate.

In some embodiments, the at least one metal carbide is at least one transition metal carbide.

In some embodiments, the acid is at least one selected from the group consisting of citric acid, acetic acid, butyric acid, sorbic acid and a combination thereof.

In some embodiments, the acid is citric acid.

In some embodiments, the polyhydroxy alcohol is at least one selected from the group consisting of ethylene glycol, sorbitol, propylene glycol, and a combination thereof.

In some embodiments, the polyhydroxy alcohol is ethylene glycol.

In some embodiments, the first temperature is from about 80° C. to about 120° C.

In some embodiments, the first temperature is from about 90° C. to about 110° C.

In some embodiments, the second temperature is from about 700° C. to about 1200° C.

In some embodiments, the second temperature is from about 750° C. to about 1050° C.

In some embodiments, the second temperature is about 800° C.

In some embodiments, the second temperature is about 850° C.

In some embodiments, the second temperature is about 900° C.

Some embodiments relate to a method of forming a metal carbide article comprising:

combining at least one metal acetate, an acid and a polyhydroxy alcohol in a first solution;

heating the first solution to a first temperature of from about 40° C. to about 200° C. to form a second solution;

placing the second solution in a form that corresponds to the metal carbide article;

heating the second solution to a second higher temperature of from about 500° C. to about 1500° C. with the addition of $H_2$ gas to form the at least one metal carbide; and cooling the at least one metal carbide;

wherein substantially no hydrocarbon gas is introduced to the first solution or second solution throughout the method.

In some embodiments, the acid is citric acid, the polyhyroxyl alcohol is ethylene glycol, the second solution has a volume that is from about 3% to about 30% of the volume of the first solution and the at least one metal acetate is a transition metal acetate.

In some embodiments, the first temperature is from about 80° C. to about 120° C. and the second temperature is from about 750° C. to about 1050° C.

Some embodiments relate to a method of forming a metal carbide coating comprising:

combining at least one metal acetate, an acid and a polyhydroxy alcohol in a first solution, heating the first solution to a first temperature of from about 40° C. to about 200° C. to form a second solution;

coating the second solution onto a surface;

heating the second solution to a second higher temperature of from about 500° C. to about 1500° C. with the addition of $H_2$ gas to form the at least one metal carbide; and cooling the at least one metal carbide;

wherein substantially no hydrocarbon gas is introduced to the first solution or second solution throughout the method.

In some embodiments, the acid is citric acid, the polyhyroxyl alcohol is ethylene glycol, the second solution has a volume that is from about 3% to about 30% of the volume of the first solution and the at least one metal acetate is a transition metal acetate.

DETAILED DESCRIPTION

Figure 1:
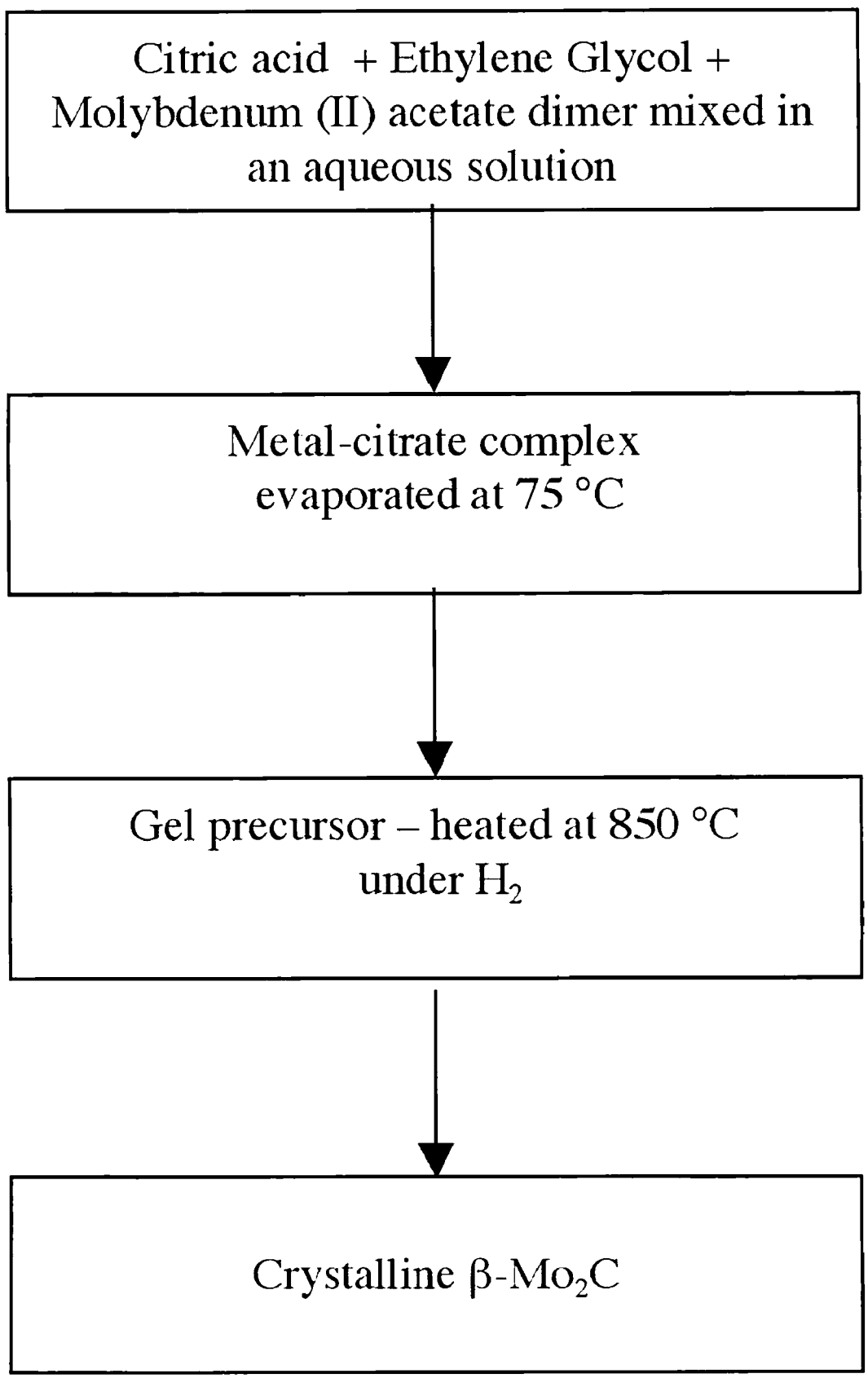
FIG. 1 is a schematic diagram of an exemplary synthetic process for making β-$Mo_2C$.

The embodiments described herein concern methods of preparing metal carbides that do not contain the formation of an intermediate oxide compound. Some embodiments, for example, relate to a method of preparing metal carbides that involves citrate gel precursors and a non-hydrocarbon gas but does not use a hydrocarbon gas, does not form an oxide intermediate species and does not utilize carbon monoxide. In some embodiments, the metal carbides are transition metal carbides.

As shown below in the examples, it was discovered that metal carbides can be prepared upon heating metal acetate precursors in the absence of hydrocarbons. Unlike traditional synthetic processes that use methane or other hydrocarbons and carbon monoxide, aspects of the embodiments described herein relate to syntheses whereby a non-hydrocarbon-containing gas, such as $H_2$, flows over metal acetate precursors, which results in the carburization process. The described process can be used for production of any metal carbide.

More embodiments relate to a convenient, environmentally friendly and economical approach for the preparation of metal carbides. By some methods, a user can tailor the surface and bulk properties and cast the material in any shape or form. Accordingly, some embodiments allow a user to create the metal carbides in a variety of forms so as to produce a variety of metal carbide articles for many different industrial uses, including but not limited to, metal carbide coatings.

By some approaches, the methods involve forming polybasic chelates between alpha hydroxyl carboxylic acids containing at least one hydroxyl group such as, citric acid and metal cations. In some embodiments, the chelate undergoes polyesterification on heating with a polyfunctional alcohol, such as ethylene glycol. Further heating produces a viscous resin, which becomes a rigid transparent glassy gel and finally a fine oxide powder. The methods provide chemical uniformity and compositional control of the resulting metal carbides. Coordination of metals in mixed-metal complexes remains almost unchanged upon polymerization and molecular level mixing is retained at the resin.

Some embodiments relate to processes of preparing carburized metals and alloys for use in fuel cell anodes for hydrogen and methanol oxidation. Other embodiments relate to processes for preparing metal carbides that have high activities for thiophene hydrodesulfurization (HDS). The present embodiments also pertain to methods of synthesizing nanostructured carbides and utilizing the high surface area to use them as supports for noble metals.

In some embodiments, the metal carbides contain transition metals such as, for example, Group IB elements, Group VB elements, Group VIB elements, Group VIIB elements, Group VIIIB elements, lanthanide series metals, and combinations thereof. Groups of elements as referred to herein are with reference to the Chemical Abstracts Registry (CAS) system for numbering the elements of the Periodic Table (e.g., Group VIII includes, among others, iron, cobalt, and nickel). In some embodiments, the transition metal is, for example, copper, silver, vanadium, chromium, molybdenum, tungsten, manganese, iron, cobalt, nickel, ruthenium, cerium, or a combination thereof. In some embodiments, the transition metal is molybdenum. Some embodiments include compositions, which comprise a plurality of transition metals (e.g., nickel and molybdenum).

Some embodiments relate to methods that involve a one-step carburization to metal carbides starting from metal acetates. When metal acetates are used as the starting materials, they can be dissolved in a solution. For example, the metal acetates can be dissolved in water. The metal acetate solution can then be combined wraith an acid and a compound with multiple OH groups.

In some embodiments, the acid can be a monocarboxylic acid such as formic acid, propionic acid, acetic acid, benzoic acid, butyric acid, sorbic acid, isolactic acid, valeric acid, isovaleric acid, pivalic acid, pentanoic acid, hexanoic acid, heptanoic acid, octanoic acid, nonanoic acid, decanoic acid, undecanoic acid, lauric acid, myristic acid, pentadecanoic acid, palmitic acid, heptadecanoic acid, stearic acid, nonadecanoic acid, eicosanoic acid; a aliphatic cyclic monocarboxylic acid such as cyclohexyl-carboxylic acid; a halogenated alkyl monocarboxylic acid such as fluoroacetic acid, trifluoroacetic acid, chloroacetic acid, dichloroacetic acid, trichloroacetic acid, bromoacetic acid, iodoacetic acid, perfluoropropionic acid, perchloroheptanoic acid, perfluoroheptanoic acid, perfluorooctanoic acid, perfluorodecanoic acid, perfluorododecanoic acid, perfluoroeicosanoic acid perfluorotetracosanoic acid; an aliphatic unsaturated monocarboxylic acid such as acrylic acid, propiolic acid, methacrylic acid, crotonic acid, isocrotonic acid, 4-hexenoic acid, oleic acid, elaidic acid; an alicyclic monocarboxylic acid such as camphoric acid, adamantanic acid; an aromatic monocarboxylic acid such as benzoic acid, naphthoic acid, anthracene carboxylic acid; an alkylated aromatic monocarboxylic acid such as toluic acid, a halogenated aromatic monocarboxylic acid such as fluorobenzoic acid, chlorobenzoic acid, bromobenzoic acid, difluorobenzoic acid, dichlorobenzoic acid, dibromobenzoic acid, trifluorobenzoic acid, trichlorobenzoic acid, tribromobenzoic acid, tetrafluorobenzoic acid, tetrachlorobenzoic acid, tetrabromobenzoic acid, pentafluorobenzoic acid, pentachlorobenzoic acid, pentabromobenzoic acid; a halogenated alkylated aromatic monocarboxylic acid such as trifluoromethylbenzoic acid, trichloromethylbenzoic acid, bis(trifluoromethyl)benzoic acid; a halogenated alkoxy aromatic monocarboxylic acid such as trifluoromethoxybenzoic acid, trichloromethoxybenzoic acid; a nitro aromatic monocarboxylic acid such as trinitrobenzoic acid; an aralkyl monocarboxylic acid such as 2-phenylpropanoic acid; an aralkylic acid such as hydroatropic acid; an arylalkenylic acid such as cinnamic acid, atropic acid; a hydroxyaliphatic monocarboxylic acid such as glycolic acid, lactic acid, glyceric acid; an aromatic hydroxyalkylmonocarboxylic acid such as benzylic acid, tropic acid; a hydroxyaromatic monocarboxylic acid such as salicylic acid, protocatechic acid, gallic acid, anisic acid, vanillic acid; an aliphatic ketone monocarboxylic acid such as pyruvic acid, acetoacetic acid, nicotinic acid, isonicotinic acid, furan carboxylic acid, thiophene carboxylic acid, 1-pyrrole carboxylic acid; p-formylphenyl acetic acid, or 6-(2-naphthyl) hexanoic acid or a combination of any one or more of the aforementioned. In a preferred embodiment, the acid is acetic acid, butyric acid, or sorbic acid or a combination thereof. In another preferred embodiment, the acid is acetic acid.

In some embodiments, the acid can be an alpha-hydroxycarboxylic acid such as citric acid, lactic acid, malic acid, tartaric acid, salicylic acid, glycolic acid or a combination thereof. In a preferred embodiment, the acid is citric acid, lactic acid, malic acid or a combination thereof. In another preferred embodiment, the acid is citric acid.

In some embodiments, the compound with multiple OH groups is a polyhydroxy alcohol such as ethylene glycol, sorbitol, propylene glycol, mannitol, diethylene glycol, 2-dimethyl-1,3-propanediol, glycerol, 1,2-propanediol, dipentaerythritol, pentaerythritol, 1,3-propenediol, 1,4-butanediol, 2,3-dimethyl -2,3-butanediol, cis-1,2-cyclopentanediol, trans-1,2-cyclohexandiol, glycerin, butylene glycol, polyethylene glycol, polypropylene glycol, polyoxyethylene glycol, polyoxypropylene glycol, sucrose, glucose, dextrose, trehalose, hexanetriol, propylene glycol, or hexylene glycol or a combination of any one or more of the aforementioned. In a preferred embodiment, the compound with multiple OH groups is ethylene glycol, sorbitol, or propylene glycol, or a combination thereof. In another preferred embodiment, the compound with multiple OH groups is ethylene glycol.

In some embodiments, the acid and the compound with multiple OH groups are present in the solution at a ratio of from about 1:20 to about 20:1 respectively. In other embodiments, the acid and the compound with multiple OH groups are present in the solution at a ratio of from about 1:10 to about 10:1 respectively. In still other embodiments, the acid and the compound with multiple OH groups are present in the solution at a ratio of from about 1:5 to about 5:1 respectively. In yet other embodiments, the acid and the compound with multiple OH groups are present in the solution at a ratio of about 1:1. That is in some embodiments, the acid and the compound with multiple OH groups are present in the solution at a ratio of from about less than, equal to, greater than, or any number in between 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, or 1:20 (expressed as either acid:compound with multiple OH groups or compound with multiple OH groups:acid).

The combined solution can be stirred on a hotplate and heated to a first temperature in a tube furnace with a non-hydrocarbon gas for a first period of time. When a reduced volume of solution remains the solution is then heated to a second higher temperature for a second period of time. Then the product is cooled to produce metallic flakes.

In some embodiments the solution is heated to a higher temperature when the volume of the solution is reduced to about 1% to about 50% of the starting solution. In other embodiments, the solution is heated to a higher temperature when the volume of the solution is reduced to about 3% to about 30% of the starting solution. In still other embodiments the solution is heated to a higher temperature when the volume of the solution is reduced to about 5% to about 20% of the starting solution. In yet other embodiments, the solution is heated to a higher temperature when the volume of the solution is reduced to about 8% to about 15% of the starting solution. In some embodiments, the non-hydrocarbon gas is $H_2$ gas. The $H_2$ gas can be, for example, about 99.95% pure with less than about 0.001% hydrocarbons. That is in some embodiments, the solution is heated to a higher temperature when the volume of the solution is reduced to from about less than, equal to, greater than, or any number in between 0.1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50%. In some embodiments the noni-hlydrocarbon gas flows throughout the method. In other embodiments, the non-hydrocarbon gas flows only during part of the method.

In some embodiments, the first temperature to which the solution is heated is from about 30° C. to about 300° C. In other embodiments, the first temperature to which the solution is heated is from about 50° C. to about 160° C. In still other embodiments, the first temperature to which the solution is heated is from about 70° C. to about 140° C. In yet other embodiments, the first temperature to which the solution is heated is to about 100° C. That is in some embodiments, the first temperature to which the solution is heated is from about less than, equal to, greater than, or any number in between 30° C., 40° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C. 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C. 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 160° C., 170° C., 180° C., 190° C., 200° C., 210° C., 220° C., 230° C., 240° C., 250° C., 260° C., 270° C., 280° C., 290° C. or 300° C.

In some embodiments. the second higher temperature to which the solution is heated is from about 400° C. to about 2000° C. In other embodiments, the second higher temperature to which the solution is heated is from about 600° C. to about 1500° C. In still other embodiments, the second higher temperature to which the solution is heated is from about 700° C. to about 1000° C. In yet other embodiments, the second higher temperature to which the solution is heated is about 850° C. That is in some embodiments, the first temperature to which the solution is heated is from about less than, equal to, greater than, or any number in between 400° C., 450° C., 500° C., 550° C., 600° C., 610° C., 620° C., 630° C., 640° C., 650° C., 660° C., 670° C., 680° C., 690° C., 700° C., 710° C., 720° C., 730° C., 740° C., 750° C., 760° C., 770° C., 780° C., 790° C., 800° C., 805° C., 810° C., 815° C., 820° C., 825° C., 830° C., 835° C., 840° C., 845° C., 846° C., 847° C., 848° C., 849° C., 850° C., 851° C., 852° C., 853° C., 854° C., 855° C., 860° C., 865° C., 870° C., 875° C., 880° C., 95° C., 96° C., 97° C., 98° C., 99° C., 100° C., 101° C., 102° C., 103° C., 104° C., 105° C., 106° C., 107° C., 885° C., 890° C., 895° C., 896° C., 897° C., 898° C., 899° C., 900° C., 901° C., 902° C., 903° C., 904° C., 905° C., 910° C., 915° C., 920° C., 925° C., 930° C., 935° C., 940° C., 945° C., 950° C., 960° C., 970° C., 980° C., 990° C., 1000° C., 1050° C., 1100° C., 1150° C., 1200° C., 1250° C. 1300° C., 1350° C., 1400° C., 1450° C., 1500° C., 1550° C., 1600° C., 1650° C., 1700° C., 1750° C., 1800° C., 1850° C., 1900° C., 1950° C., or 2000° C.

In some embodiments, the first period of time is from about 1 to about 20 hours. In other embodiments, the first period of time is from about 2 to about 8 hours. In still other embodiments, the first period of time is from about 3 to about 6 hours. That is in some embodiments, the first period of time is from about less than, equal to, greater than, or any number in between 0.1 hours, 0.5 hours, 1 hour, 1.5 hours, 2 hours, 2.5 hours, 3 hours, 3.5 hours, 4 hours, 4.5 hours, 5 hours, 5.5 hours, 6 hours, 6.5 hours, 7 hours, 7.1 hours, 7.2 hours, 7.3 hours, 7.4 hours, 7.5 hours, 7.6 hours. 7.7 hours, 7.8 hours, 7.9 hours, 8 hours, 8.1 hours, 8.2 hours. 8.3 hours, 8.4 hours, 8.5 hours, 8.6 hours, 8.7 hour. 8.8 hours, 8.9 hours, 9 hours, 9.5 hours, 10 hours. 10.5 hours, 11 hours, 12 hours, 12.5 hours, 13 hours. 13.5 hours, 14 hours, 15 hours, 16 hours, 17 hours, 18 hours. 19 hours or 20 hours.

In some embodiments, the second period of time is from about 8 hours to about 50 hours. In other embodiments, the second period of time is from about 10 to about 30 hours. In still other embodiments, the second period of time is from about 12 hours to about 20 hours. In yet other embodiments, the second period of time is about 14 hours. That is in some embodiments, the second period of time is from about less than, equal to, greater than, or any number in between 8 hours, 8.5 hours, 9 hours. 9.5 hours, 10 hours, 10.5 hours, 11 hours, 11.5 hours, 12 hours, 12.5 hours. 13 hours, 13.1 hours, 13.2 hours, 13.3 hours, 13.4 hours, 13.5 hours, 13.6 hours, 13.7 hours, 13.8 hours, 13.9 hours, 14 hours, 14.1 hours, 14.2 hours, 14.3 hours, 14.4 hours, 14.5 hours, 14.6 hours, 14.7 hour, 14.8 hours, 14.9 hours, 15 20 hours, 21 hours, 22 hours, 23 hours, 24 hours, 25 hours, 30 hours, 35 hours, 40 hour, 45 hours or 50 hours.

In some embodiments, the heating and cooling of the solution and product is done gradually. For example, the solution can be heated at about 2° C./min and cooled at about 5° C./min, however, the present embodiments are not so limited and include many variations on the rate of heating and cooling of the solution and product.

The following examples are provided for illustrative purposes only, and are in no way intended to limit the scope of the present embodiments.

EXAMPLE 1

Synthesis of β-Mo$_2$C

An aqueous solution was prepared by dissolving commercially available molybdenum (II) acetate dimer (Mo$_2$(OCOCH$_3$)$_4$) (Aldrich) into 100 ml H$_2$O in an amount sufficient to result in an about a 1 mM solution. Ethylene glycol (HOCH$_2$CH$_2$OH) and citric acid (HOC(COOH)(CH$_2$COOH)$_2$) were dissolved in 50 ml water in about 1:1 molar ratio. These two solutions were combined and heated moderately in a larger beaker with vigorous stirring on a hotplate. The light green aqueous solution became brown and then reddish brown. With a few hours of applied heating and stirring, the solution became redder and then reverted back to light green. The solution was heated on a stir/hotplate until there was about 10 ml of solution left. Ethylene glycol was varied between 1:1 and 6:1 molar ratios to molybdenum without change to the crystal structure. The resulting viscous green solution was pipetted into an alumina crucible and heated in a tube furnace (Lindberg®) under H$_2$ flow (0.15 mL/sec) with a ramp rate of 2° C./min up to 850° C. for 14 hours and then cooled at 5° C./min. The H$_2$ flow was turned off when the samples cooled down to less than 100° C., when they were opened to the atmosphere. The H$_2$ was 99.95% pure with less than 0.001% hydrocarbons. The product was collected as metallic flakes. The synthetic process for β-Mo$_2$C is shown schematically in FIG. 1.

EXAMPLE 2

Figure 2:
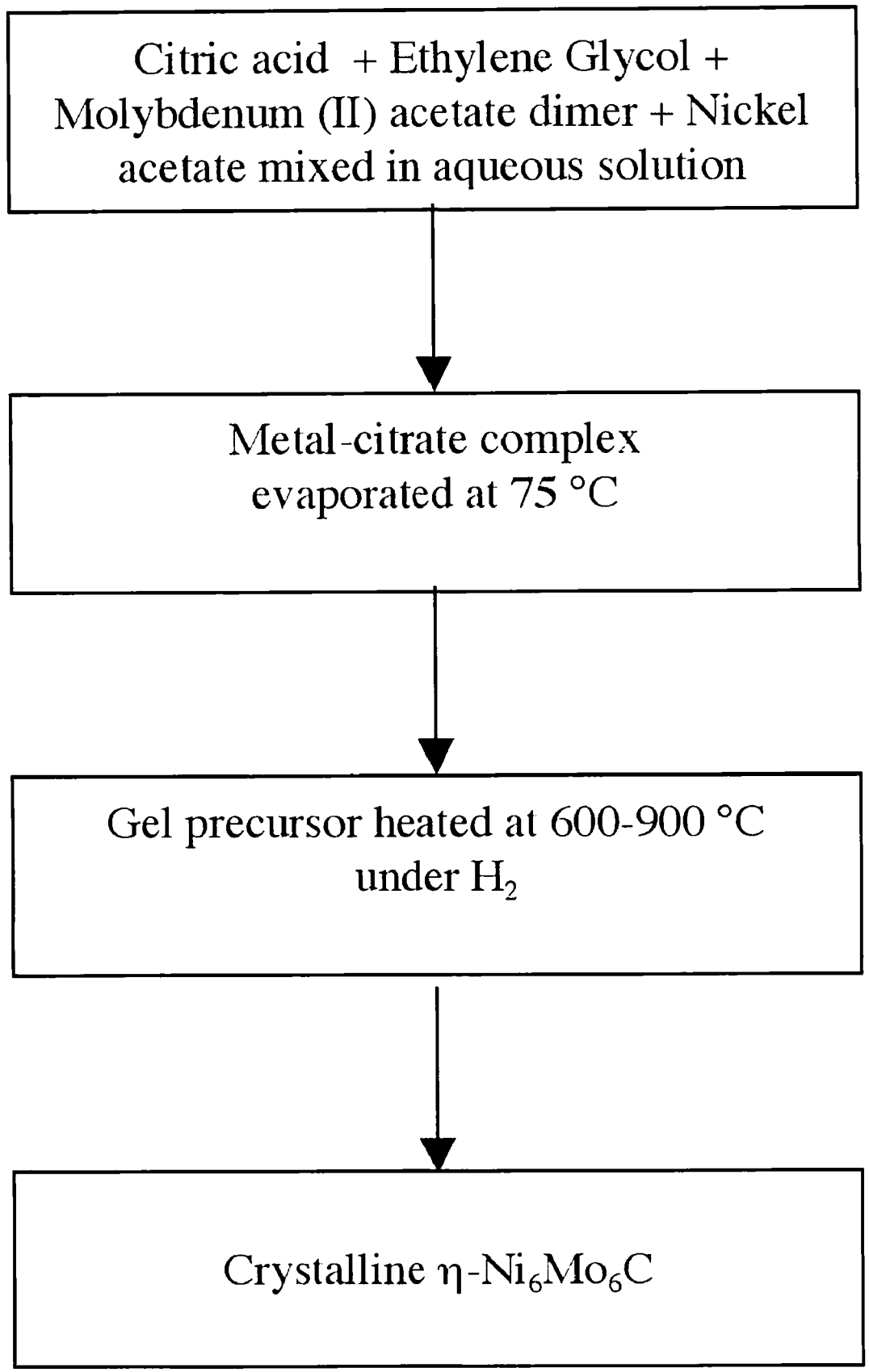
FIG. 2 is a schematic diagram of an exemplary synthetic process for making η-$Ni_6Mo_6C$.

Synthesis of η-Ni$_6$Mo$_6$C

η-Ni$_6$Mo$_6$C was synthesized starting from molybdenum (II) acetate dimer and nickel (II) acetate (Ni(OCOCH$_3$)$_2$.xH2O) (Alfa Aesar). The Mo-acetates and Ni-acetates were dissolved in a 1:1 molar ratio of Mo and Ni to form a 250 mL (40 mM) aqueous solution. Ethylene glycol and citric acid (1:1 M ratio) were added to form a 3:2 M ratio of ethylene glycol to nickel. The solution was heated to 85° C. in a beaker with vigorous stirring on a hotplate and was evaporated on the hotplate for a few hours at 75° C. until the contents were viscous. The resulting reddish brown viscous solution was pipetted into an alumina crucible and heated in a tube furnace with a ramp rate of 2° C./min to a temperature of from about 600° C. to about 900° C. for from about 12 to about 14 hours under 9 mL/min flowing H$_2$ and then cooled at 5° C./min. The H$_2$ flow was turned off when the samples cooled down to less than 100° C., when they were opened to the atmosphere. The synthesis of η-Ni$_6$Mo$_6$C is shown schematically in FIG. 2.

EXAMPLE 3 (COMPARATIVE)

Synthesis of η-Ni$_6$Mo$_6$C by Gas-Phase Carburization

Standards of η-Ni$_6$Mo$_6$C were also prepared by gas-phase carburization using a conventional method. Ni(en)$_3$MoO$_4$ was placed in a tube furnace (alumina tube, i.d.=3.81 cm) under a combination of flowing H$_2$ and Ar at 24.3 mL/min each (2.1 cm/min linear flow rate) and heated at 15° C./min to 650° C., where the temperature was held for 30 min. The gas was switched to pure Ar at 50 mL/min (4.3 cm/min linear flow rate) and heated to 1000° C. at 15° C./min, at which point the gases were switched to a mixture of Ar, CO, and CO$_2$ at 61 mL/min and 20 mL/min, respectively, to impose a carbon activity of 0.011. The reaction was run for 3 hours, after which the reactor was allowed to cool to ambient temperature under flowing Ar at 61 mL/min.

EXAMPLE 4

Characterization of Products

The resulting product from each of Examples 1, 2 and 3 were characterized for structure, porosity, and composition. Differential thermal analysis (DTA, Rheometric Scientific, Inc. ®, STA1500) was carried out using a mixture of Ar and 5% $H_2$ (MG Industries, analyzed to 99.95% purity). XRD measurements were made both with and without an internal Si standard (CuKβ radiation: 40 kV, 40 mA; 1.2° 2θ/min step size; Bruker D8 Advance). The lattice parameters of the η-$Ni_6Mo_6C$ were determined from their d-spacings, as obtained from Bruker's EVA program, and using a least-squares analysis program for lattice parameter refinement, UnitCell for OSX (v0.3). The lattice parameters were corrected to those of an internal silicon standard, which was refined from the d-spacings of the measured data using UnitCell, and then corrected to the NIST standard value for Si (a=5.43104 Å). The correction percentage for the measured vs. standard Si value was used to adjust the refined lattice parameter of the cubic η-$Ni_6Mo_6C$.

The XRD patterns were also used to determine domain sizes, through analysis of the most intense diffraction peak with the Scherrer equation (e.g., the scattering angle at 43.5° 2θ for the η-$Ni_6Mo_6C$). The particle morphology of both materials was also characterized with SEM (Leo Supra 55®) with 1 and 2 kV voltage operating conditions and an in-lens detector. Surface areas were determined by nitrogen physisorption using a Micromeritics® ASAP2010 Accelerated Surface Area and Porosimetry Analyzer. The sample was degassed at 150° C. for at least 12 h prior to characterization. Specific surface areas were determined using the multipoint BET method. Elemental analyses were performed by Desert Analytics, Inc. ®, Tucson, Ariz.

Figure 3:
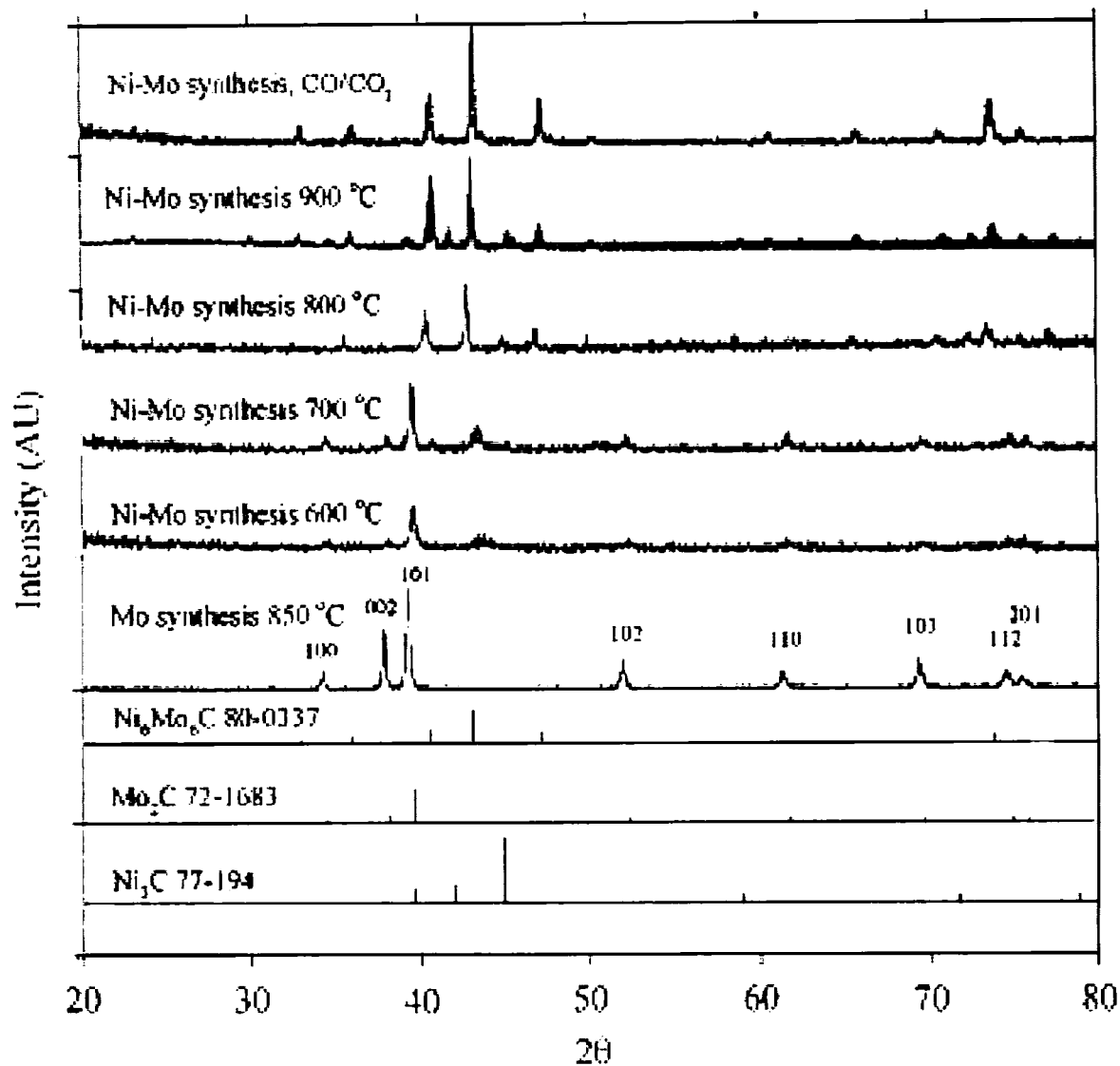
FIG. 3 depicts X-ray diffraction (XRD) patterns of compounds made from Mo-acetate and mixtures of Ni and Mo-acetates.

C. under $H_2$ have XRD patterns that match to the JCPDS pattern 80-0337 of the η-12 phase for $Ni_6Mo_6C$ (FIG. 3). Their lattice parameters were 10.8570.01 and 10.86070.009 Å for materials heated to 800° C. and 900° C., respectively. The materials heated to 800° C. were dull-colored flakes and those heated at 900° C. were shiny flakes. Both samples exhibit additional small scattering angle peaks at ca. 45° and 59° C. 2θ, which are assigned to $Ni_3C$, and are most prevalent in the sample heated at 900° C. Without wishing to be bound to a particular theory, the suggested presence of $Ni_3C$ in this sample and lack of $Mo_2C$ or Mo impurities implies the volatilization of traces of Mo. The XRD data for the sample heated at 900° C. suggest the presence of Ni peaks at 77.5° and 94.4° C. 2θ. There are also NiC impurities because of peaks at 51.8°, 75.4°, and 92.4° 2θ. Without wishing to be bound by a particular theory the coexistence of Ni, NiC, or $Ni_3C$ may be a result of a slight excess of Ni-acetate that was added to compensate for commercial $Ni(CH_3COO)_2 \cdot xH2O$ being a hydrate. Analysis of the XRD peak widths indicate that the η-$Ni_6Mo_6C$ heated at 800° C. and 900° C. and the $Mo_2C$ formed at 700° C. all have crystal domain sizes of 30 nm; the $Ni_3C$ impurities in the 900° C.-treated sample are about 15 nm in diameter. The samples derived from Ni— and Mo-acetates and heated at 600 and 700° C. for 12 h under $H_2$ are dull colored and predominantly have a distorted β-$Mo_2C$ structure. There is a trace of $Ni_3C$ even as low as 700° C. as indicated by a small peak at 451 2θ. This small presence of $Ni_3C$ likely coexists with β-$Mo_2C$ and η-$Ni_6Mo_6C$ to maintain the stoichiometric ratio.

Figure 4:
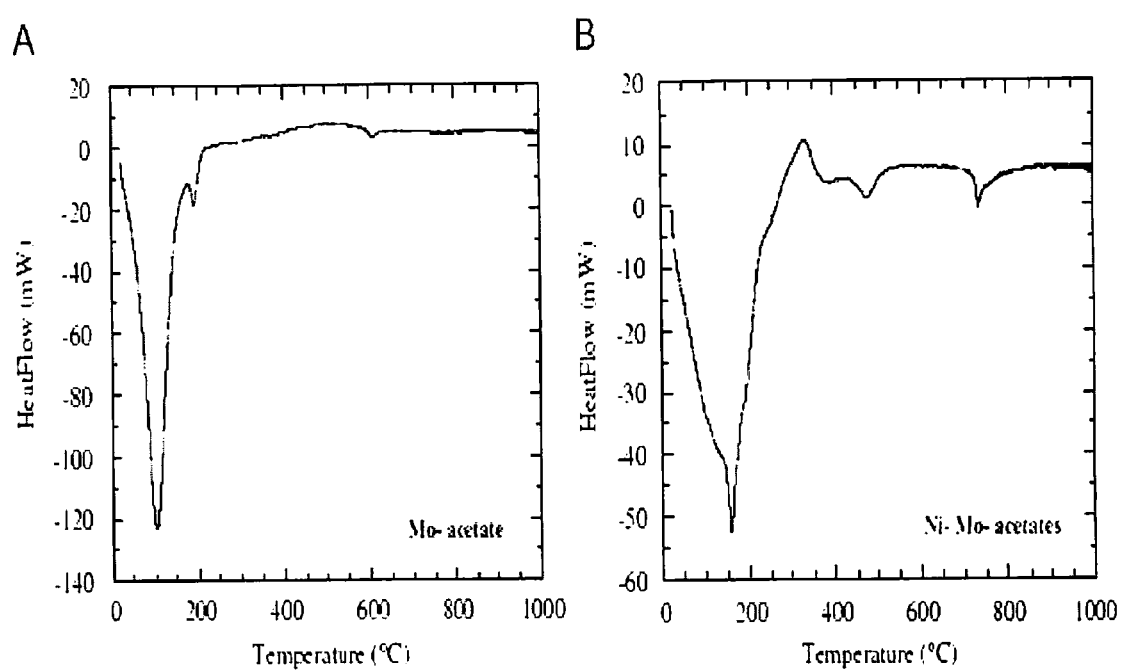
FIG. 4 depicts a differential thermal analysis of the metal acetate precursors with ethylene glycol and citric acid under 2° C./min 2.5% $H_2$/Ar flow for the exemplary compounds described in Examples 1 and 2.

FIG. 4 displays the DTA (Differential Thermal Analysis) of both Mo-acetate and mixed Mo— and Ni-acetates under 2.5% $H_2$ in Ar. In the thermogram of the Mo acetate precursor above 250° C., there is only one endotherm at ~600° C., while there are three for the Mo— and Ni-acetate precursor mixture. The thermogram for the mixed Mo— and Ni-acetate exhibits a small endotherm at 380° C., a slightly larger one at

TABLE 1

Results from different heat treatments of Pechini precursors plus η-$Ni_6Mo_6C$ made by carbothermal reduction

| Metal precursor(s) | Heating conditions | Phase(s) present by XRD | Appearance |
|---|---|---|---|
| (a) Mo (II) acetate dimer | 850° C. $H_2$ 12 h | β-$Mo_2C$ | Dull metal |
| (b) Ni(II) acetate, Mo (II) acetate dimer | 900° C. $H_2$ 12 h | η-$Ni_6Mo_6C$ + $Ni_3C$ + trace NiC + Ni | Shiny |
| Ni(II) acetate, Mo (II) acetate dimer | 900° C. $H_2$ 12 h | η-$Ni_6Mo_6C$ + trace $Ni_3C$ | Discolored shiny |
| Ni(II) acetate, Mo (II) acetate dimer | 700° C. $H_2$ 12 h | β-$Mo_2C$ + trace η-$Ni_6Mo_6C$ + $Ni_3C$ | Dull metal |
| Ni(II) acetate, Mo (II) acetate dimer | 600° C. $H_2$ 12 h | β-$Mo_2C$ | Dull metal |
| Tri(ethylene diamine) nickel molybdate | 1000° C. $H_2$ CO/$CO_2$ | η-$Ni_6Mo_6C$ | Shiny |

Table 1 summarizes the appearance and crystal phases of the materials made from the Mo-acetate and Ni—Mo-acetates at various temperatures. The compound synthesized from Mo-acetate using ethylene glycol, citric acid, and heating under $H_2$ matches well to JCPDS (Joint Committee on Powder Diffraction Standards) pattern no. 72-1683 for the hexagonal β-phase of $Mo_2C$, as shown in FIG. 4. The compounds synthesized from Ni— and Mo-acetate mixtures with ethylene glycol and citric acid (process in at 800° C. and 900°

475° C., and a sharp one at 730° C. Without wishing to be bound to a particular theory, the endotherm at 730° C. could be attributed to formation of η-$Ni_6Mo_6C$, while those at lower temperatures could be attributed to the formation of β-$Mo_2C$ and $Ni_3C$. The thermal analysis is consistent with the observation of $Ni_3C$ impurities by XRD for the samples heated at 700° C. and above. The reduction and formation of η-$Ni_6Mo_6C$ above 730° C. and β-$Mo_2C$ below 730° C. are in agreement with the XRD results in Table 1.

Figure 5:
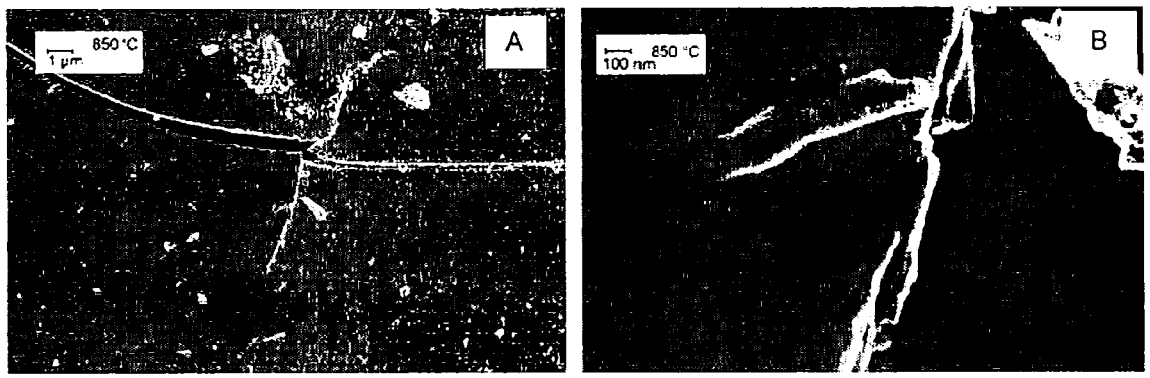
FIG. 5 is a scanning electron microscopy (SEM) image of an exemplary Mo-acetate gel heated under $H_2$ at 850° C. magnified at (A) 5000× and (B) 50,000×.

The morphology of the β-Mo$_2$C formed by heating Mo-acetate with the precursors at 850° C. under H$_2$ is shown in FIG. 5. This compound has a low surface area (non-porous but granular) with some micrometer- and submicrometer-sized particles and a flake-like habit.

Figure 6:
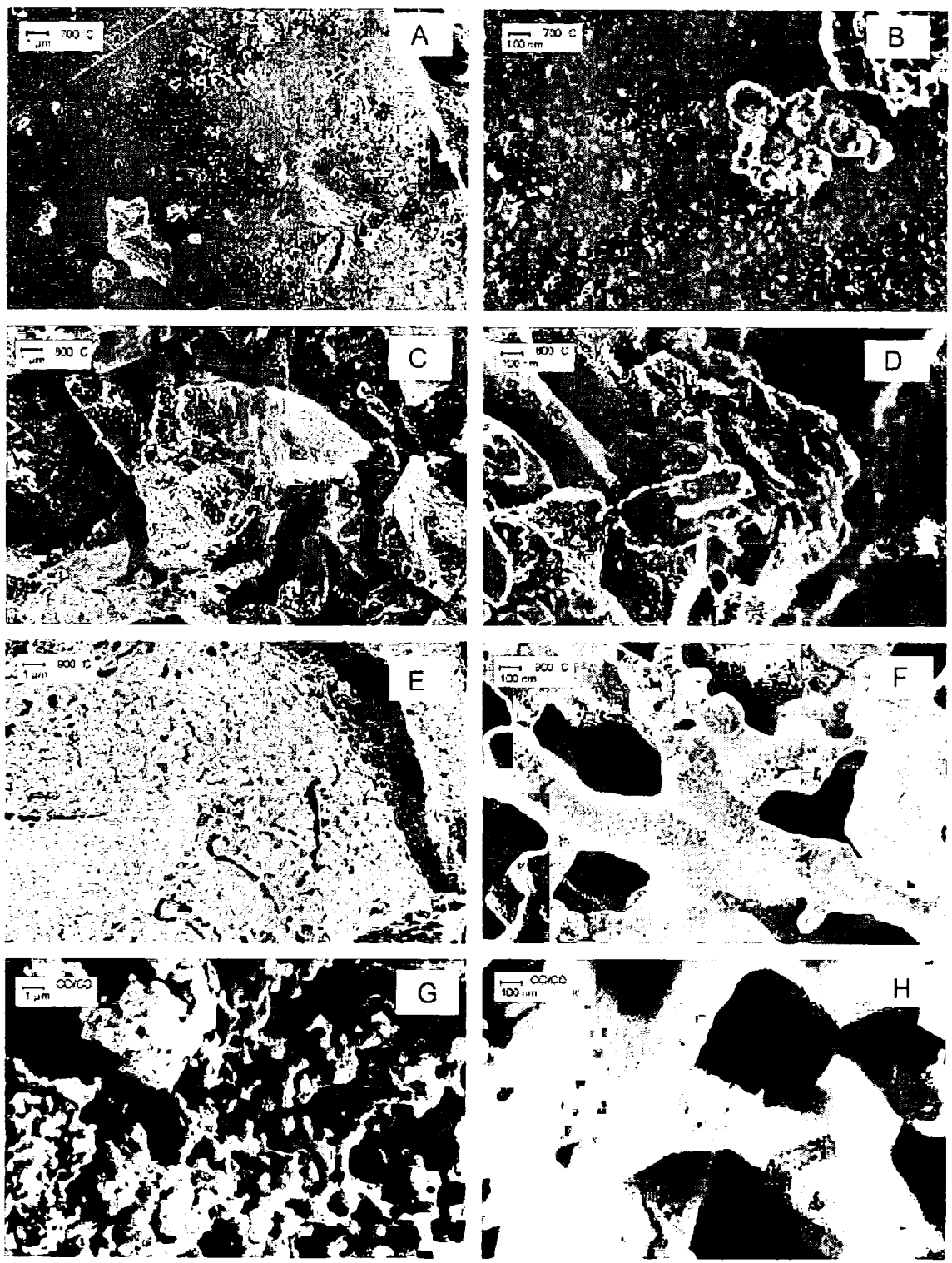
FIG. 6 is a collection of SEM images of exemplary compounds made from Ni— and Mo-organics and $CO/CO_2$ processes at 5000× and 50,000×.
Figure 7:
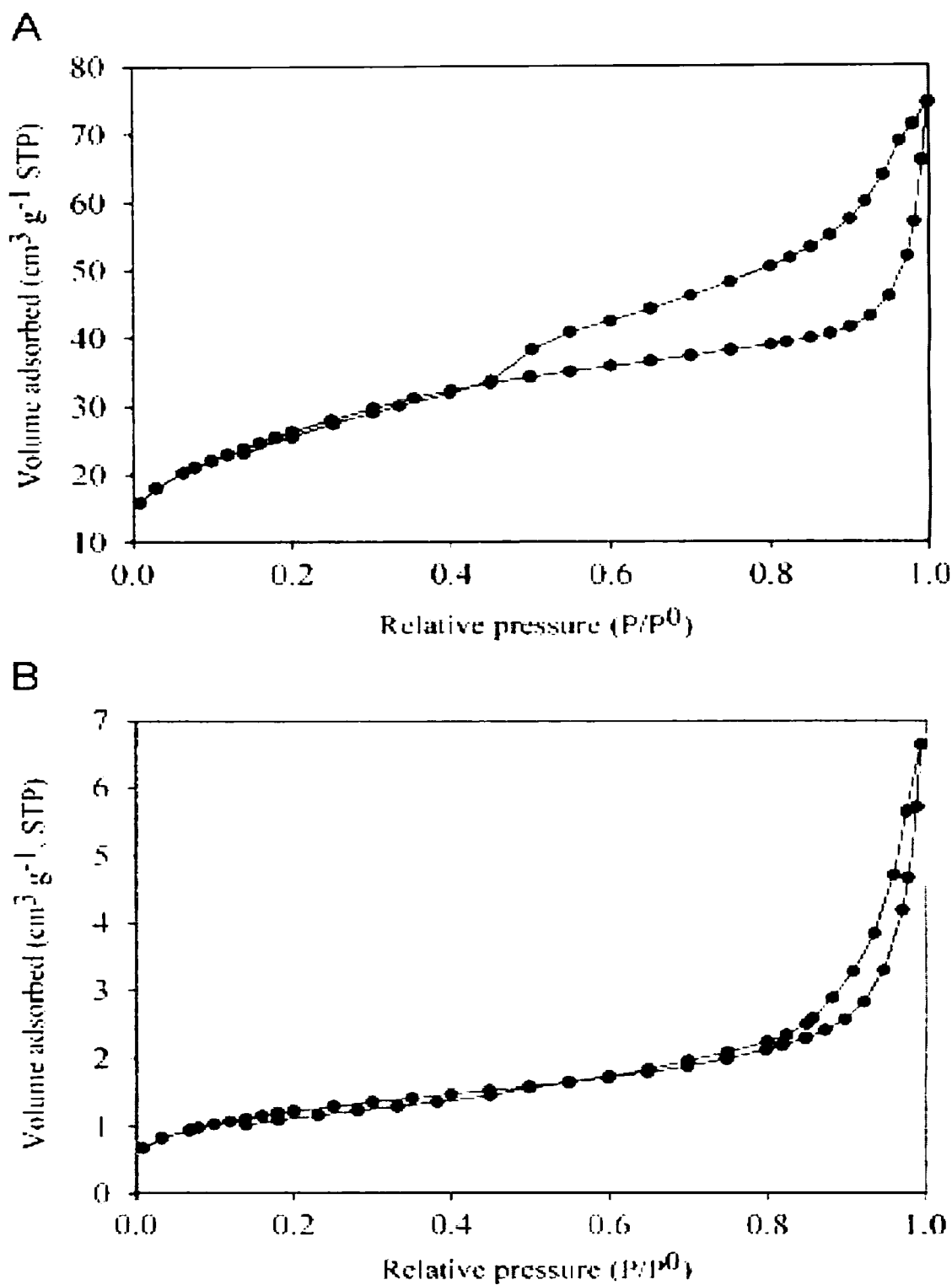
FIG. 7 depicts N2-sorption isotherms for the prepared η-$Ni_6Mo_6C$ samples with different heat treatments of (A) 800° C. and (B) 900° C.

The SEM images of the various compounds made from Ni— and Mo-acetate precursors are shown in FIG. 6. The η-Ni$_6$Mo$_6$C phases that formed at 800 and 900° C. have more porosity than the predominantly Mo$_2$C phases that formed at lower temperatures from similar starting resins. Without wishing to be bound to a particular theory the β-Mo$_2$C (with traces of η-Ni$_6$Mo$_6$C) formed by heating the Ni— and Mo-acetate mixture under H$_2$ at 700° C. (FIGS. 6A and 6B) appears almost identical to that in the pure Mo-compound, shown in FIG. 5, with low surface area (non-porous but granular) and micrometer- and submicrometer-sized particles. The same Ni— and Mo-acetates heated to 800° C. (η-Ni$_6$Mo$_6$C with a trace of Ni$_3$C) have ~10 μm domains with some nanoparticles and porosity in some regions (FIGS. 7C and 7D). The compound made at 900° C. under H$_2$, (η-Ni$_6$Mo$_6$C with a small amount of Ni$_3$C) is highly porous (FIGS. 6E and 6F). As shown in Table 2, the η-Ni$_6$Mo$_6$C prepared at 800° C. has a surface area of 95.5 m$^2$/g while the sample prepared at 900° C. has less than 10 m$^2$/g. Not wishing to be bound to a particular theory, the drastic decrease in surface area could be attributed to the sintering of η-Ni$_6$Mo$_6$C. The uptake of N$_2$ from the adsorption isotherm is greater for the 800° C.-heated than the 900° C.-heated sample as in FIG. 7. The isotherms indicate greater mesoporosity for the 800° C.-heated sample. The median pore volume of the 800° C. and 900° C.-heated samples for pores over 5 nm is 0.05 and 0.002 cm$^3$/g, respectively. The broad pore size distribution is similarly shaped for both materials with a larger pore volume for the 800° C.-heated sample.

TABLE 2

Surface area properties and percent elements present of different heat treatments of metal acetate precursors of η-Ni$_6$Mo$_6$C. Ni(II) acetate + Mo (II) acetate dimer with ethylene glycol and citric acid

| Treatment (° C.) | Surface Area (m$^2$/g)$^a$ | C (1350° C.)$^b$ | H | Mo$^c$ | Ni$^c$ |
|---|---|---|---|---|---|
| 900 | 4.5 | 2.2 | <0.06 | 66.6 | 31.1 |
| 800 | 95.5 | 13.0 | 0.28 | 26.6 | 60.1 |

$^a$Surface areas were determined from BET.
$^b$Carbon content for the heat-treated samples was measured at 1350° C.
$^c$The analytical error was 75% for metals.

Elemental analysis in Table 2 for the 900° C.-heated sample shows a slight excess of carbon in the powder compared with the theoretical values of 1.27% C, 37.5% Ni, and 61.2% Mo.

It is to be understood that unless otherwise indicated the present embodiments are not limited to specific reactants, reaction conditions, or the like, as such may vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "a compound" or "an acid" encompasses a combination or mixture of different compounds or acids as well as a single compound or acid, reference to "a substituent" includes a single substituent as well as two or more substituents that may or may not be the same, and the like. The present embodiments not limited to the above examples and can be variously modified. The above description of the preferred embodiments, including the examples, is intended only to acquaint others skilled in the art with the present embodiments, their principles and practical applications so that others skilled in the art may understand the disclosed embodiments in their numerous forms.

With reference to the use of the words comprise or comprises or comprising in this entire specification (including the claims below), unless the context requires otherwise, those words are used on the basis and clear understanding that they are to be interpreted inclusively, rather than exclusively, and it is intended that each of those words to be so interpreted in construing this entire specification.

EQUIVALENTS

The foregoing written specification is considered to be sufficient to enable one skilled in the art to practice the invention. The foregoing description details certain preferred embodiments and describes the best mode contemplated by the inventors. It will be appreciated, however, that no matter how detailed the foregoing may appear in text, the present embodiments may be practiced in many ways and should be construed in accordance with the appended claims and any equivalents thereof.

What is claimed is:

1. A method of preparing at least one metal carbide comprising:
   combining at least one metal acetate, an acid and a polyhydroxy alcohol in a first solution;
   heating the first solution to a first temperature of from about 40° C. to about 200° C. to form a second solution;
   heating the second solution to a second higher temperature of from about 500° C. to about 1500° C. with the addition of H$_2$ gas to form the at least one metal carbide; and
   cooling the at least one metal carbide;
   wherein substantially no hydrocarbon gas is introduced to the first solution or second solution throughout the method.

2. The method of claim 1, wherein the second solution has a volume that is from about 3% to about 30% of the volume of the first solution.

3. The method of claim 1, wherein the at least one metal acetate is at least one transition metal acetate.

4. The method of claim 3, wherein the at least one metal carbide is at least one transition metal carbide.

5. The method of claim 1, wherein the acid is at least one selected from the group consisting of citric acid, malic acid, lactic acid, acetic acid, butyric acid, sorbic acid and a combination thereof.

6. The method of claim 1, wherein the acid is citric acid.

7. The method of claim 1, wherein the polyhydroxy alcohol is at least one selected from the group consisting of ethylene glycol, sorbitol, propylene glycol, and a combination thereof.

8. The method of claim 1, wherein the polyhydroxy alcohol is ethylene glycol.

9. The method of claim 1, wherein the first temperature is from about 80° C. to about 120° C.

10. The method of claim 1, wherein the first temperature is from about 90° C. to about 110° C.

11. The method of claim 1, wherein the second temperature is from about 700° C. to about 1200° C.

12. The method of claim 1, wherein the second temperature is from about 750° C. to about 1050° C.

13. The method of claim 1, wherein the second temperature is about 800° C.

14. The method of claim 1, wherein the second temperature is about 850° C.

15. The method of claim 1, wherein the second temperature is about 900° C.

16. A method of forming a metal carbide article comprising:
   combining at least one metal acetate, an acid and a polyhydroxy alcohol in a first solution;
   heating the first solution to a first temperature of from about 40° C. to about 200° C. to form a second solution;
   placing the second solution in a form that corresponds to the metal carbide article;
   heating the second solution to a second higher temperature of from about 500° C. to about 1500° C. with the addition of $H_2$ gas to form the at least one metal carbide; and
   cooling the at least one metal carbide;
   wherein substantially no hydrocarbon gas is introduced to the first solution or second solution throughout the method.

17. The method of claim 16, wherein the acid is citric acid, the polyhyroxyl alcohol is ethylene glycol, the second solution has a volume that is from about 3% to about 30% of the volume of the first solution and the at least one metal acetate is a transition metal acetate.

18. The method of claim 16, wherein the first temperature is from about 80° C. to about 120° C. and the second temperature is from about 750° C. to about 1050° C.

19. A method of forming a metal carbide coating comprising:
   combining at least one metal acetate, an acid and a polyhydroxy alcohol in a first solution;
   heating the first solution to a first temperature of from about 40° C. to about 200° C. to form a second solution;
   coating the second solution onto a surface;
   heating the second solution to a second higher temperature of from about 500° C. to about 1500° C. with the addition of $H_2$ gas to form the at least one metal carbide; and
   cooling the at least one metal carbide;
   wherein substantially no hydrocarbon gas is introduced to the first solution or second solution throughout the method.

20. The method of claim 19, wherein the acid is citric acid, the polyhyroxyl alcohol is ethylene glycol, the second solution has a volume that is from about 3% to about 30% of the volume of the first solution and the at least one metal acetate is a transition metal acetate.

* * * * *